US010720140B2

(12) United States Patent
Kim

(10) Patent No.: US 10,720,140 B2
(45) Date of Patent: Jul. 21, 2020

(54) DIGITAL ACTIVE ROAD NOISE CONTROL METHOD AND SYSTEM

(71) Applicants: Hyundai Motor Company, Seoul (KR); Kia Motors Corporation, Seoul (KR)

(72) Inventor: Young Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/174,568

(22) Filed: Oct. 30, 2018

(65) Prior Publication Data

US 2019/0139531 A1 May 9, 2019

(30) Foreign Application Priority Data

Nov. 8, 2017 (KR) ........................ 10-2017-0148255

(51) Int. Cl.
*G06F 1/26* (2006.01)
*H04M 1/60* (2006.01)
*G10K 11/178* (2006.01)

(52) U.S. Cl.
CPC ...... *G10K 11/178* (2013.01); *G10K 11/17833* (2018.01); *G10K 11/17879* (2018.01); *G10K 2210/1282* (2013.01); *G10K 2210/12821* (2013.01); *G10K 2210/503* (2013.01)

(58) Field of Classification Search
CPC ......... G10K 11/178; G10K 2210/1282; G10K 11/17879; G06F 1/266; H04M 1/6033
USPC .................................................. 381/71.4, 59
See application file for complete search history.

(56) References Cited

U.S. PATENT DOCUMENTS

2009/0268899 A1* 10/2009 Tokuda ............... H04M 1/6033 379/420.02
2016/0034416 A1* 2/2016 Chavez .................. G06F 1/266 381/59

FOREIGN PATENT DOCUMENTS

JP 2004-229238 A 8/2004

* cited by examiner

*Primary Examiner* — Vivian C Chin
*Assistant Examiner* — Ubachukwu A Odunukwe
(74) *Attorney, Agent, or Firm* — Morgan, Lewis & Bockius LLP

(57) ABSTRACT

An active road noise control method in an active road noise controller disposed in a vehicle may include diagnosing whether a plurality of microphones connected in a daisy chain has failed, receiving a data frame from the plurality of microphones, identifying normal information related to information included in the data frame based on a result of diagnosis, generating a digital noise control signal using the identified normal information, and transmitting the generated digital noise control signal to an external amplifier.

18 Claims, 10 Drawing Sheets

DIGITAL ACTIVE ROAD NOISE CONTROL METHOD AND SYSTEM

CROSS-REFERENCE TO RELATED APPLICATION

The present application claims priority to Korean Patent Application No. 10-2017-0148255, filed on Nov. 8, 2017, the entire contents of which is incorporated herein for all purposes by this reference.

BACKGROUND OF THE INVENTION

Field of the Invention

The present invention relates to a method and apparatus configured for reducing noise in a vehicle and, more particularly, to a digital active road noise control method and system configured for minimizing a delay time required to recognize failure of a part after a part such as a microphone has failed in the digital active noise control system.

Description of Related Art

Vehicles have evolved into entertainment and information exchange means in addition to transportation means.

With advance of vehicles and development of information communication technology, head units of currently released vehicles may be configured to perform various functions in addition to audio control functions of FM/AM, CD, etc. and an air conditioning control function. Examples of such various functions may include Bluetooth, web browsing, chatting, TV viewing, navigation, gaming, a function for capturing photos or videos, a sound storage function and a function for displaying images or videos.

To this end, vehicle manufacturers have made considerable efforts to develop hardware and software to provide more complex and multiple functions.

Conventionally, as a method of reducing driving noise generated upon driving a vehicle, various sound absorbing and insulating materials and low-noise tires have been used.

However, a road noise reduction method through hardware such as a sound absorbing and insulating material and a low-noise tire may increase costs and vehicle weight, thereby deteriorating fuel efficiency.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a digital active road noise control method and system that substantially obviate one or more problems due to limitations and disadvantages of the related art.

Various aspects of the present invention are directed to providing a digital active road noise control method and system.

Various aspects of the present invention are directed to providing a digital active road noise control method and system configured for minimizing a delay time required to recognize failure of a part after a part such as a microphone has failed in the digital active noise control system.

The technical problems solved by the present invention are not limited to the above technical problems and other technical problems which are not described herein will become apparent to those skilled in the art from the following description.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

To achieve these objects and other advantages and in accordance for an exemplary embodiment of the present invention, as embodied and broadly described herein, an active road noise control method in an active road noise controller disposed in a vehicle may include diagnosing whether a plurality of microphones connected in a daisy chain has failed, receiving a data frame from the plurality of microphones, identifying normal information related to information included in the data frame based on a result of diagnosis, generating a digital noise control signal using the identified normal information; and transmitting the generated digital noise control signal to an external amplifier.

The active road noise control method may further include receiving a reference signal from a plurality of acceleration sensors connected in a daisy chain, wherein the active road noise controller is configured to generate the digital noise control signal by further using the reference signal.

The data frame and the reference signal may be received through communication of at least one automotive audio bus (A2B).

The active road noise controller may include a first digital signal processor communicating with the plurality of microphones and a second digital signal processor communicating with the first digital signal processor.

When power is applied to the active road noise controller, the first digital signal processor may diagnose whether failure has occurred and transmits the result of diagnosis to the second digital signal processor.

The data frame may include slots corresponding in number to the number of microphones connected in the daisy chain, and the first digital signal processor may extract and transmit a slot including the normal information from among the slots included in the data frame to the second digital signal processor based on the result of diagnosis.

The active road noise controller may transmit the digital noise control signal to the external amplifier through A2B communication.

The external amplifier may include a mixing digital signal processor, and the mixing digital signal processor mixes a digital sound source signal received from a sound source digital signal processor with the digital noise control signal and transmits the mixed signal to a digital power amplifier.

According to various aspects of the present invention, an active road noise controller connected to an external amplifier for a vehicle to control active road noise may include a first digital signal processor for diagnosing whether a plurality of microphones connected in a daisy chain has failed and identifying normal information related to information included in a data frame based on a result of diagnosis upon receiving the data frame from the plurality of microphones and a second digital signal processor for generating a digital noise control signal using the identified normal information and transmitting the generated digital noise control signal to the external amplifier.

The first digital signal processor may further receive and provide a reference signal from a plurality of acceleration sensors connected in a daisy chain to the second digital signal processor, and the second digital signal processor generates the digital noise control signal by further using the reference signal.

The data frame and the reference signal may be received through communication of at least one automotive audio bus (A2B).

When power is applied to the active road noise controller, the first digital signal processor may diagnose whether failure has occurred and transmits the result of diagnosis to the second digital signal processor.

The data frame may include slots corresponding in number to the number of microphones connected in the daisy chain, and the first digital signal processor may extract and transmit a slot including the normal information from among the slots included in the data frame to the second digital signal processor based on the result of diagnosis.

The second digital signal processor may transmit the digital noise control signal to the external amplifier through A2B communication.

The external amplifier may include a mixing digital signal processor, the mixing digital signal processor may mix a digital sound source signal received from a sound source digital signal processor with the digital noise control signal to generate digital active road noise control sound, and the digital active road noise control sound may be output as an analog signal through a digital power amplifier and a speaker provided in the external amplifier.

The output analog signal may be fed back and input to the plurality of microphones.

According to various aspects of the present invention, an active road noise control system disposed in a vehicle to control road noise generated upon driving the vehicle may include an active road noise controller including a first digital signal processor for diagnosing whether a plurality of microphones connected in a daisy chain has failed and identifying normal information related to information included in a data frame based on a result of diagnosis upon receiving the data frame from the plurality of microphones, and a second digital signal processor for generating a digital noise control signal using the identified normal information, and an external amplifier for mixing the digital noise control signal with a digital sound source signal received from a sound source digital signal processor and generating and outputting digital active road noise control sound.

The aspects of the present invention are only a portion of the exemplary embodiments of the present invention, and various embodiments based on technical features of the present invention may be devised and understood by a person having ordinary skill in the art based on the detailed description of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
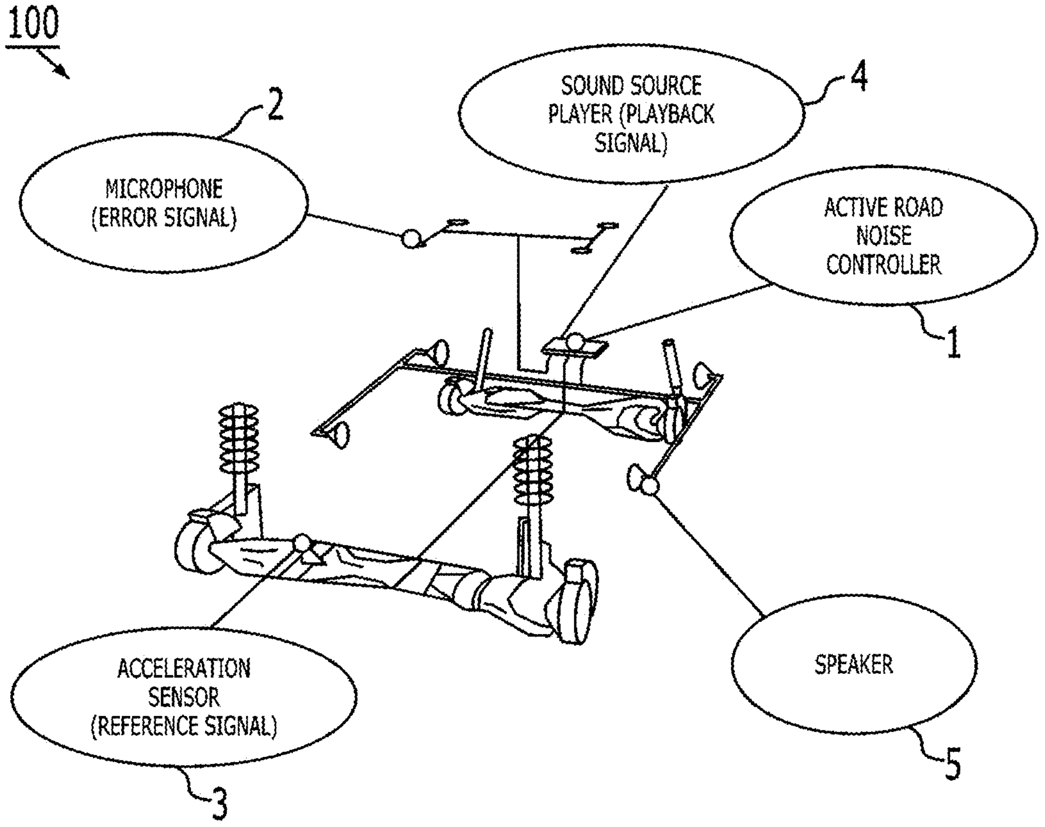
FIG. 1 is a diagram schematically illustrating operation of an active road noise control system disposed in a vehicle according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an apparatus and various methods, to which the exemplary embodiments of the present invention are applied, will be described in detail with reference to the accompanying drawings. The suffixes "module" and "unit" of elements herein are used for convenience of description and thus may be used interchangeably and do not have any distinguishable meanings or functions.

FIG. 1 is a diagram schematically illustrating operation of an active road noise control (ARNC) system disposed in a vehicle according to an exemplary embodiment of the present invention.

Referring to FIG. 1, the active road noise control system 100 may include an active road noise controller 1, a microphone 2, an acceleration sensor 3, a sound source player 4 and a speaker 5.

Here, it is noted that the number of microphones 2, acceleration sensors 3 and speakers 5 configuring the active road noise control system 100 may be changed according to the design of a person skilled in the art.

The active road noise controller 1 may receive a noise control signal which is an error signal input to the microphone 2. Here, a plurality of microphones 2 may be connected in a daisy chain and then connected to the active road noise controller 1.

The active road noise controller 1 may receive road noise information collected by the acceleration sensor 3, that is, a reference signal.

The active road noise controller 1 may generate a noise control signal using the error signal received from the microphone 2 and the reference signal received from the acceleration sensor 3. Thereafter, the active road noise controller 1 may mix the noise control signal and sound output from the sound source player 4, that is, a playback signal, and output the mixed signal through the speaker 5.

Accordingly, the active road noise control system 100 according to an exemplary embodiment of the present invention may output a sound source of a reverse phase of noise coming from a road surface, reducing noise of the road surface felt by a passenger in a vehicle upon driving the vehicle.

Furthermore, the active road noise control system 100 according to an exemplary embodiment of the present invention can efficiently reduce noise of a road surface through software control through a digital signal processor (DSP) without using hardware such as a sound absorbing and insulating material or a low-noise tire. Furthermore, since the present invention can reduce the weight of a vehicle, fuel efficiency may be improved.

Figure 2:
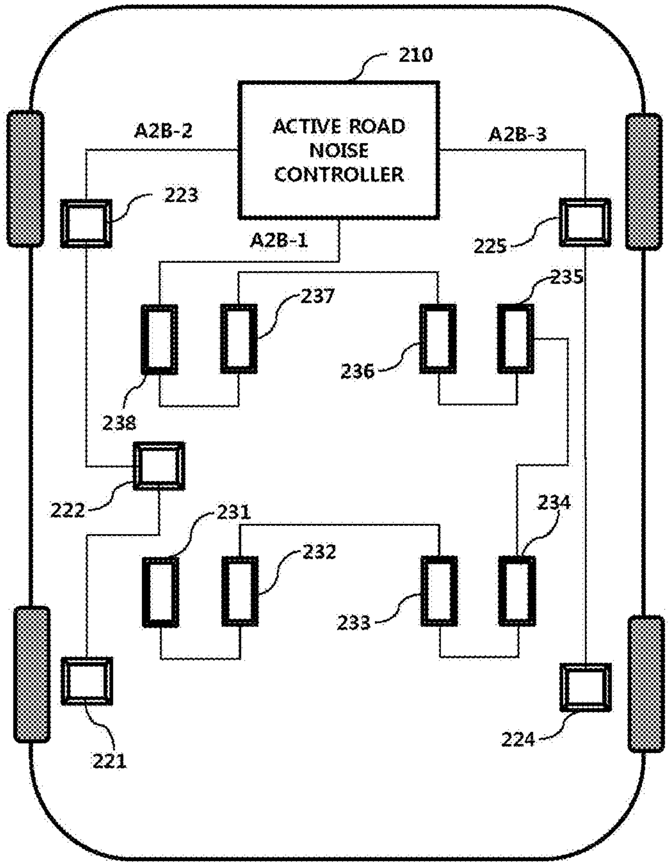
FIG. 2 is a diagram showing a layout structure of a microphone and an acceleration sensor connected to an active road noise controller according to an exemplary embodiment of the present invention.

FIG. 2 is a diagram showing a layout structure of a microphone and an acceleration sensor connected to an active road noise controller according to an exemplary embodiment of the present invention.

Referring to FIG. 2, first to eighth microphones 231, 232, 233, 234, 235, 236, 237 and 238 connected in the daisy chain may be connected to the active road noise controller 210 through a first automotive audio bus (A2B) (hereinafter, referred to as A2B-1).

In general, the daisy chain is a serialized data communication method and refers to the configuration of continuously connected hardware devices. For example, the daisy chain may mean a bus connection method of connecting a device A with a device B and connecting the device B with a device C upon connecting the devices A, B and C. A. At the instant time, the last device is generally connected to a resistance device or a terminal device, for example, the active road noise controller of FIG. 2. All devices may receive the same signal but each device belonging to a chain may modify the content of one or more signals before transmission of one or more signals to another device significantly differently from a simple bus.

On an A2B single two-wire, a master-slave line topology for transmitting audio and control data along with time (clock) and power may be used.

The A2B is suitable for an in-vehicle audio application, such as a hands-free system, a voice recognition system or an active road noise cancellation system.

The active road noise controller 210 may be connected to left three acceleration sensors 221, 222 and 223 connected in the daisy chain through a second automotive audio bus (hereinafter, A2B-2).

Furthermore, the active road noise controller 210 may be connected to right two acceleration sensors 224 and 225 connected in the daisy chain through a third automotive audio bus (hereinafter, A2B-3).

In general, since the acceleration sensor has large current consumption, it is preferable for system stability to connect the acceleration sensor with the active road noise controller 210 using a plurality of A2Bs.

Although the active road noise controller 210 is shown as being connected to eight microphones and five acceleration sensors in the exemplary embodiment of FIG. 2, this is merely an exemplary embodiment and more or less microphones and acceleration sensors may be configured according to the design and configuration of the vehicle in other exemplary embodiments.

When the vehicle starts up, the active road noise controller 210 may diagnose whether the first to eighth microphones 231, 232, 233, 234, 235, 236, 237 and 238 and the first to fifth acceleration sensors 221, 222, 223, 224 and 225 have failed through a predetermined control procedure. For example, the active road noise controller 210 may transmit a keep-alive message to the first to eighth microphones and the first to fifth acceleration sensors and diagnose whether a corresponding device has failed according to a response thereto.

Figure 3:
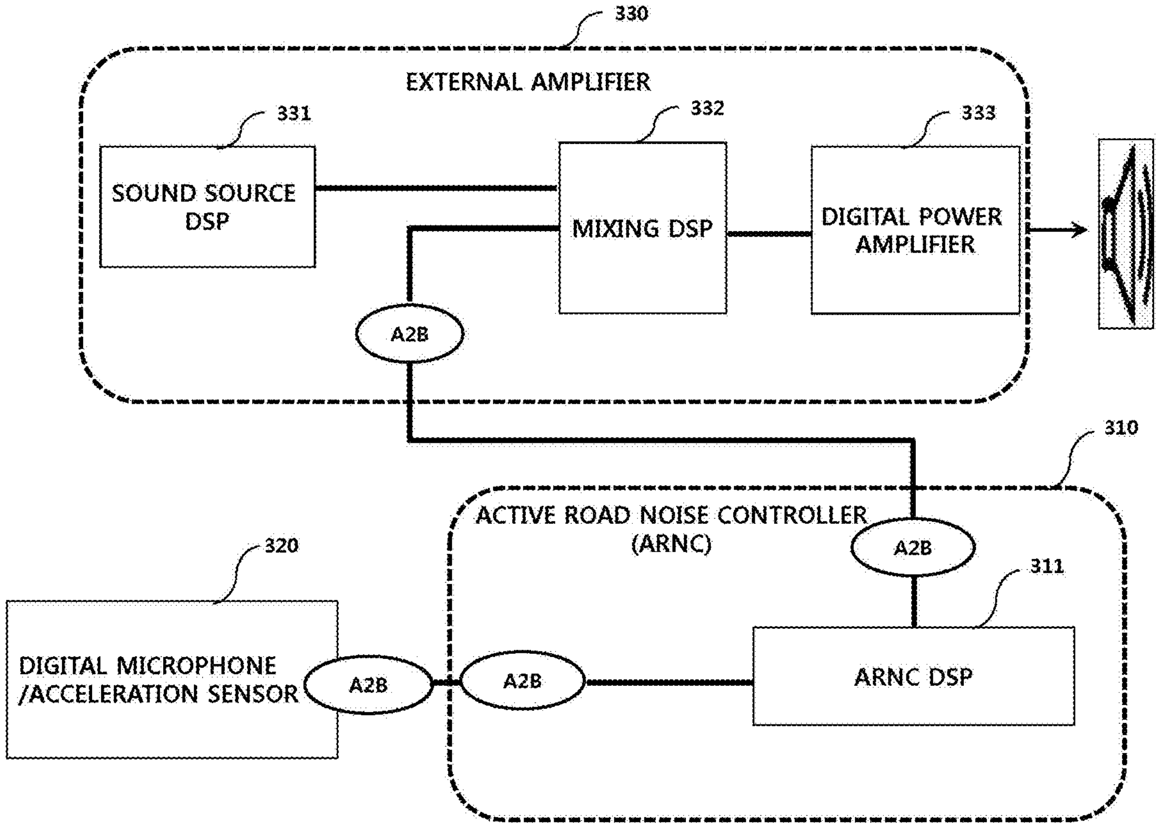
FIG. 3 is a block diagram illustrating the configuration of an active road noise control system according to an exemplary embodiment of the present invention.

FIG. 3 is a block diagram illustrating the configuration of an active road noise control system according to an exemplary embodiment of the present invention.

Referring to FIG. 3, an active road noise control system 300 may include an active road noise controller 310, a digital microphone/acceleration sensor 320 and an external amplifier 330.

Here, the active road noise controller 310 may include an ARNC DSP 311 including a plurality of DSPs and a plurality of A2B communication interfaces.

The external amplifier 330 may include a sound source DSP 331 for providing a digital sound source, a mixing DSP 332 for mixing a digital noise control signal received from the active road noise controller 310 with a digital sound source signal received from the sound source DSP 331 to generate digital active noise control sound, and a digital power amplifier 333 for performing digital-to-analog conversion with respect to the digital active noise control sound, amplifying the converted signal and outputting the amplified signal through a speaker.

The active noise control sound output through the digital power amplifier 333 may be input to the digital microphone again to be fed back to the active road noise controller 310.

The active road noise control system 300 may exchange a control signal and a digital data signal with the digital microphone/acceleration sensor 320 and the external amplifier 330 through the A2B.

The active road noise controller 310 may receive an error signal from the digital microphone through the A2B and receive a reference signal from the acceleration sensor.

The active road noise controller 310 may generate a digital noise control signal using the error signal and the reference signal. Here, the generated digital noise control signal may be transmitted to the mixing DSP 332 through A2B communication.

Since the active road noise control system according to an exemplary embodiment of the present invention performs digital communication using the A2B, it is possible to minimize wiring cost in the vehicle for signal transmission.

Figure 4:
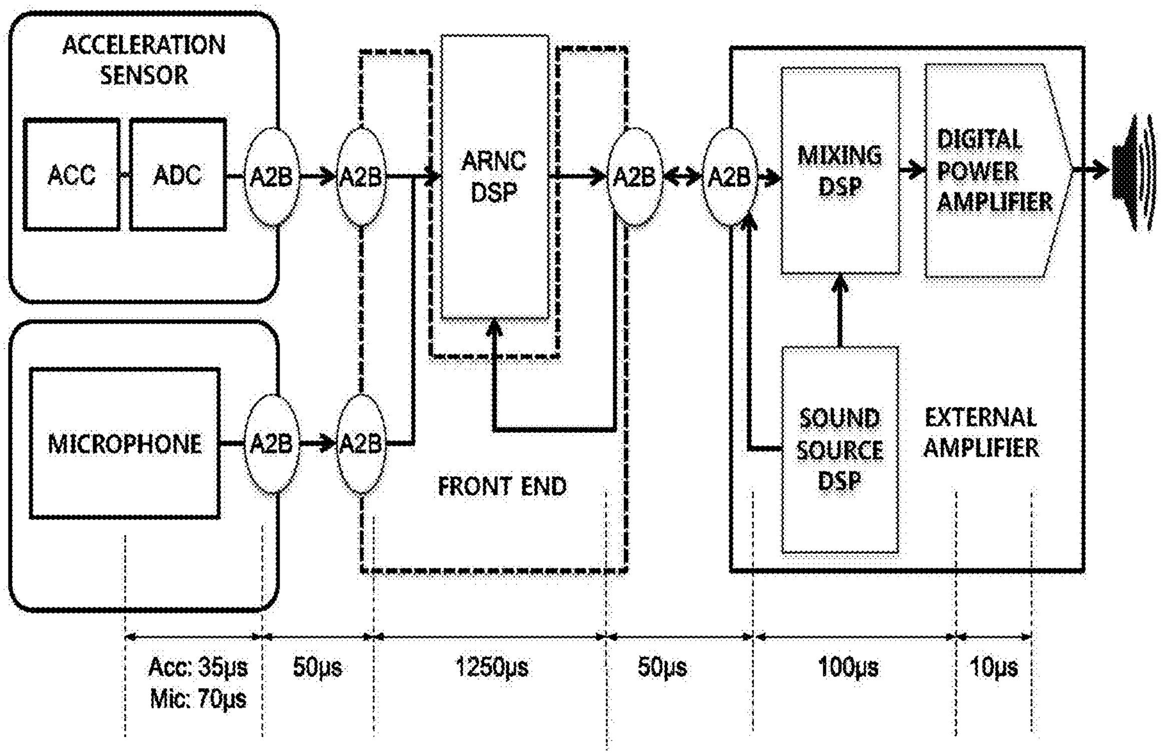
FIG. 4 is a diagram illustrating a processing delay time in an active road noise control system according to an exemplary embodiment of the present invention.

FIG. 4 is a diagram illustrating a processing delay time in an active road noise control system according to an exemplary embodiment of the present invention.

FIG. 4 shows that, among the processing times of the devices currently configuring the active road noise control system, a processing time required by the ARNC DSP is the largest at 1250 μs. FIG. 4 shows that the processing performance of the ARNC DSP has largest influence on overall system performance. Accordingly, to improve overall system performance, it is important to minimize the processing delay time of the ARNC DSP.

Figure 5:
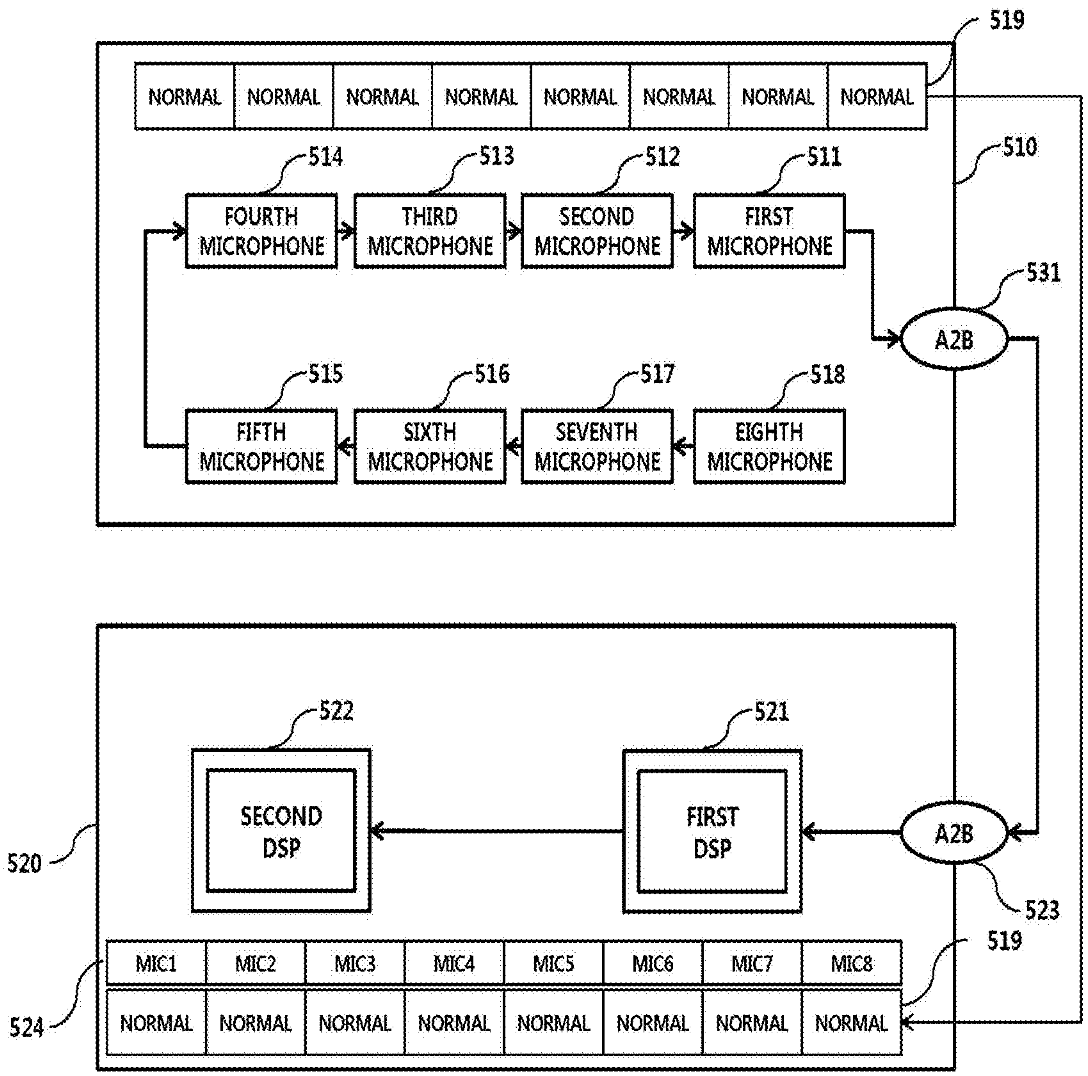
FIG. 5 is a diagram illustrating a procedure of processing microphone information in an active road noise control system according to an exemplary embodiment of the present invention.

FIG. 5 is a diagram illustrating a procedure of processing microphone information in an active road noise control system according to an exemplary embodiment of the present invention.

Referring to FIG. 5, an active road noise controller 520 may include a first DSP 521 and a second DSP 522.

The first DSP 521 may receive a data frame 519 from a microphone 510 through an A2B 523 port. Here, the data frame may be configured by sequentially connecting information corresponding to the first to eighth microphones 511 to 518 connected in a daisy chain, that is, error information input through the microphones. If the number of microphones connected in the daisy chain is 8, one data fame may be composed of 8 slots.

The first DSP 521 may assign a MIC ID 524 to each piece of information included in the data frame 519 and transmit the MIC ID to the second DSP 522.

The second DSP 522 may generate a digital noise control signal using the data frame 519 received from the microphones connected in the daisy chain, that is, the error signal, and the reference signal received from the acceleration sensor.

FIG. 5 illustrates the case where the information included in the data frame 519 are all normal, that is, the first to eighth microphones connected in the daisy chain are all normal, for example.

However, assigning the MIC ID 524 to the data frame 519 is advantageous in that it is possible to clearly determine to which microphone the information included in the data frame 519 corresponds. However, this may cause overall performance deterioration in a data processing time. Accordingly, it is necessary to minimize processing delay of the data frame 519 in the active road noise controller 520.

Figure 6:
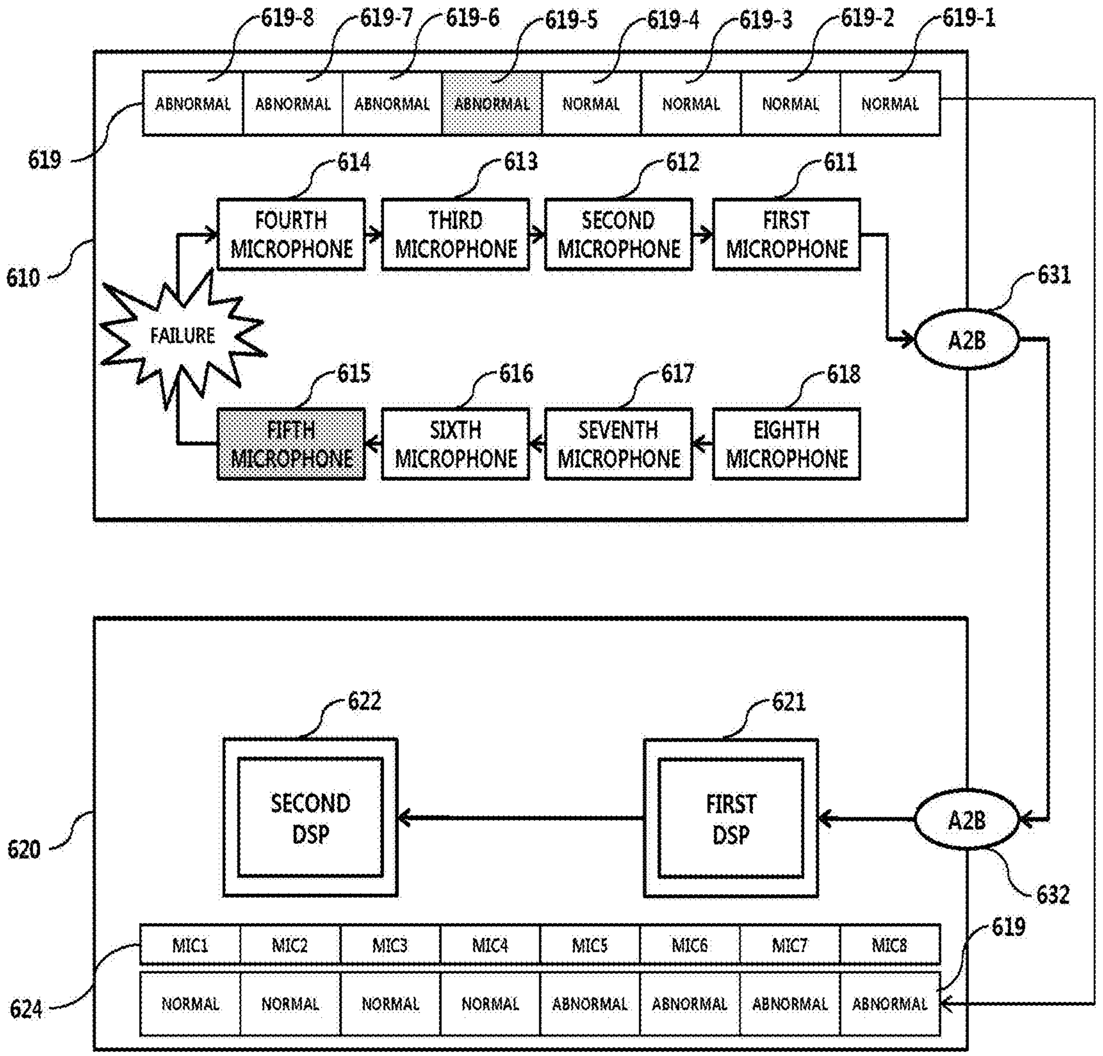
FIG. 6 is a diagram illustrating a procedure of processing a microphone signal in an active road noise control system according to another exemplary embodiment of the present invention.

FIG. 6 is a diagram illustrating a procedure of processing a microphone signal in an active road noise control system according to another exemplary embodiment of the present invention.

FIG. 6 illustrates a method of processing a data frame in an active road noise control system when at least one of the microphones connected in a daisy chain has failed.

Referring to FIG. 6, if a fifth microphone 615 among microphones 610 connected in a daisy chain has failed, information recorded in a slot 619-5 corresponding to the fifth microphone 615 of the data frame 619 may be abnormal. Furthermore, information recorded in slots 619-6, 619-7 and 619-8 corresponding to the sixth microphone 616, the seventh microphone 617 and the eighth microphone 618 disposed at the rear stage of the fifth microphone 615 may be abnormal.

The first DSP 621 may receive the data frame 619 from the microphone 610 through an S2B 623 port. Here, the data frame 619 may be configured by sequentially connecting information corresponding to the first to eighth microphones 611 to 618 connected in the daisy chain, that is, error information input through corresponding microphones.

The first DSP 621 may assign a MIC ID 624 to each piece of information included in the data frame 619 and transmit the MIC ID to the second DSP 622.

The second DSP 622 may generate a digital noise control signal using the data frame 619 received from the microphones connected in the daisy chain, that is, the error signal, and the reference signal received from the acceleration sensor. However, the second DSP 622 may generate the digital noise control signal using only normal information related to the slots of the data frame 619.

Figure 7:
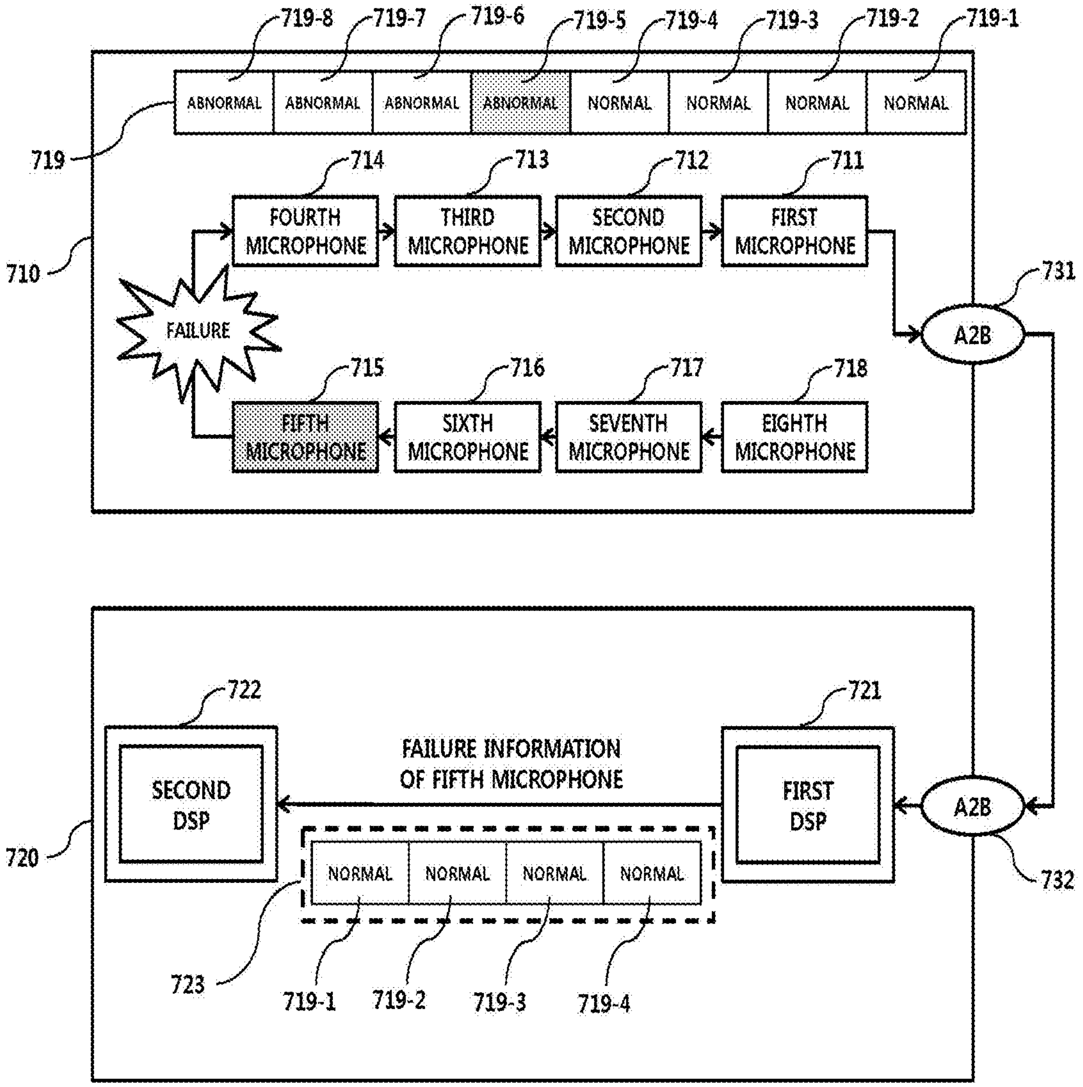
FIG. 7 is a diagram illustrating a method of minimizing processing delay in an active road noise control system according to an exemplary embodiment of the present invention.

FIG. 7 is a diagram illustrating a method of minimizing processing delay in an active road noise control system according to an exemplary embodiment of the present invention.

FIG. 7 illustrates a data frame processing method in an active road noise controller for minimizing processing delay when at least one of microphones connected in a daisy chain has failed.

Referring to FIG. 7, if a fifth microphone 715 among microphones 710 connected in a daisy chain has failed, information recorded in a slot 719-5 corresponding to the fifth microphone 715 of the data frame 719 may be abnormal. Furthermore, information recorded in slots 719-6, 719-7 and 719-8 corresponding to the sixth microphone 716, the seventh microphone 717 and the eighth microphone 718 disposed at the rear stage of the fifth microphone 715 may be abnormal due to the properties of the daisy chain.

When power is applied to the active road noise controller 720, for example, when the vehicle starts up, the first DSP 721 may verify whether the microphones connected in the daisy chain have failed on an A2B through a predetermined diagnosis procedure. For example, the first DSP 721 may verify whether the microphone has failed based on the response to the keep-alive message per microphone but this is merely an exemplary embodiment and another diagnosis procedure of verifying whether the microphone has failed is applicable according to the design of a person skilled in the art.

The first DSP 721 may receive the data frame 719 including eight slots from the microphone 710 through the A2B 723 port. Here, the data frame 719 may be configured by sequentially connecting information corresponding to the first to eighth microphones 711 to 718 connected in a daisy chain, that is, error information input through corresponding microphones.

The first DSP 721 may verify whether the microphone has failed through a predetermined control procedure. For example, as shown in FIG. 7, if the fifth microphone 715 has failed, the first DSP 721 may transmit, to the second DSP 722, predetermined information (hereinafter, for convenience of description, referred to as "fifth microphone failure information") indicating that failure of the fifth microphone 715 is sensed. Upon determining that the fifth microphone 715 has failed, the second DSP 722 may determine that the sixth microphone 716, the seventh microphone 717 and the eighth microphone 718 disposed at the rear stage of the fifth microphone 715 have failed.

Upon receiving the data frame 719 through the A2B 723 port, the first DSP 721 may identify slots of the data frame 719 including normal information, based on the result of determining whether the microphone has failed. The first DSP 721 may transmit only slots including normal information to the second DSP 722. That is, upon determining that the fifth microphone 715 has failed, the first DSP 721 may extract and transmit only the first to fourth slots 719-1, 719-2, 719-3 and 719-4 corresponding to the first to fourth microphones 711, 712, 713 and 714 from the data frame 719 to the second DSP 722 and may not transmit abnormal slots, that is, the fifth to eighth slots 719-5, 719-6, 719-7 and 719-8, to the second DSP 722. Based on the pre-received information indicating that the fifth microphone has failed, the second DSP 722 may determine that information on the slots included in the frame 723 received from the first DSP 721 corresponds to the first to fourth microphones 711, 712, 713 and 714.

The first DSP 721 according to the exemplary embodiment may not assign the MIC ID to each piece of information included in the data frame 719.

Furthermore, the first DSP 721 according to the exemplary embodiment of FIG. 7 may remove the slots 719-5, 719-6, 719-7 and 719-8 including abnormal information due to microphone failure, configure the frame 723 using the slots 719-1, 719-2, 719-3 and 719-4 including normal information and transmit the frame to the second DSP 722.

Accordingly, the present invention may reduce the amount of information transmitted from the first DSP 721 to the second DSP 722 and thus minimize processing delay in the active road noise controller 720.

Figure 8:
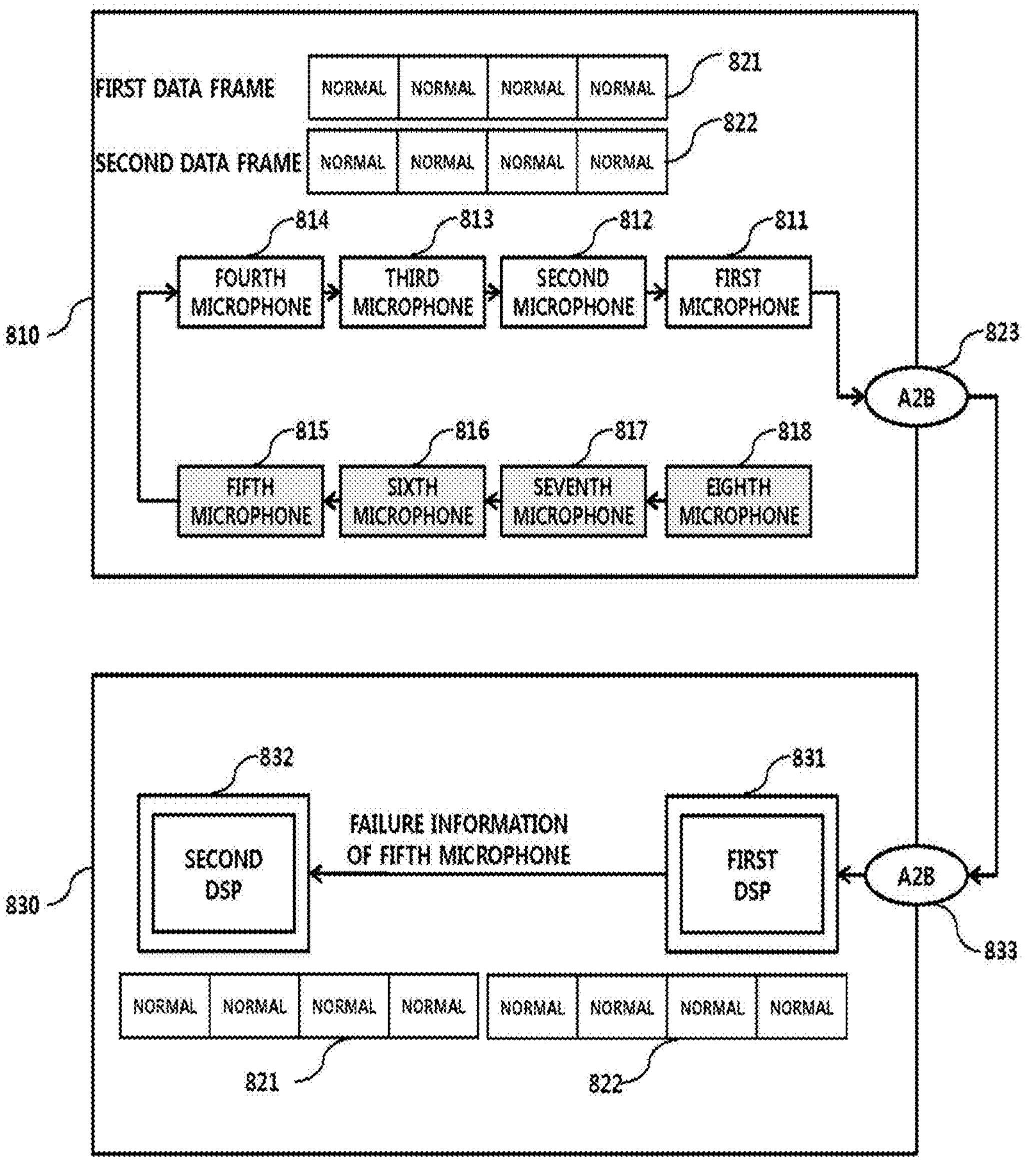
FIG. 8 is a diagram illustrating a method of minimizing processing delay in an active road noise control system according to various exemplary embodiments of the present invention.

FIG. 8 is a diagram illustrating a method of minimizing processing delay in an active road noise control system according to various exemplary embodiments of the present invention.

In FIG. 8, when the active road noise control system is rebooted, for example, when the vehicle is turned off and then is turned on again, in a state in which the fifth microphone 815 among eighth microphones connected in a daisy chain has failed, an A2B 823 may recognize that only the first to fourth microphones 811, 812, 813 and 814 are connected in a daisy chain. In the instant case, the A2B 823 of the microphone 810 may generate and transmit data frames 821 and 822 including four slots corresponding to the four microphones 811, 812, 813 and 814 connected in the daisy chain to an A2B 833 of an active road noise controller 830.

When the active road noise controller 830 is driven again, the first DSP 831 may confirm that the first microphone 811, the second microphone 812, the third microphone 813 and the fourth microphone 814 are normal through a predetermined diagnosis procedure. At the instant time, the second DSP 832 may determine that the microphone 810 still includes the first to eighth microphones. To solve this, the first DSP 831 may transmit, to the second DSP 832, predetermined microphone failure information indicating that the fifth microphone 832 has failed.

The first DSP 831 may sequentially transmit a first data frame 821 and a second data frame 822 received through the A2B 833 to the second DSP 832 without any additional processing. That is, the first DSP 831 may bypass the data frame received through the A2B to the second DSP 832 without any additional processing. Accordingly, it is possible to minimize processing delay in the first DSP 831.

The second DSP 832 may recognize that the fifth to eighth microphones 815, 816, 817 and 818 have failed based on microphone failure information received from the first DSP 831. Accordingly, the second DPS 832 may confirm that the data frame received from the first DSP 831 includes the information slots corresponding to the first microphone 811, the second microphone 812, the third microphone 813 and the fourth microphone 814.

The second DSP 832 may generate a digital noise control signal according to a predetermined algorithm using the information collected from the first microphone 811, the second microphone 812, the third microphone 813 and the fourth microphone 814.

The first DSP 831 of the active road noise controller 830 according to the exemplary embodiment may provide the same performance, that is, the same processing delay time, with a lower clock frequency, as compared to the second DSP 821 of FIG. 5.

Figure 9:
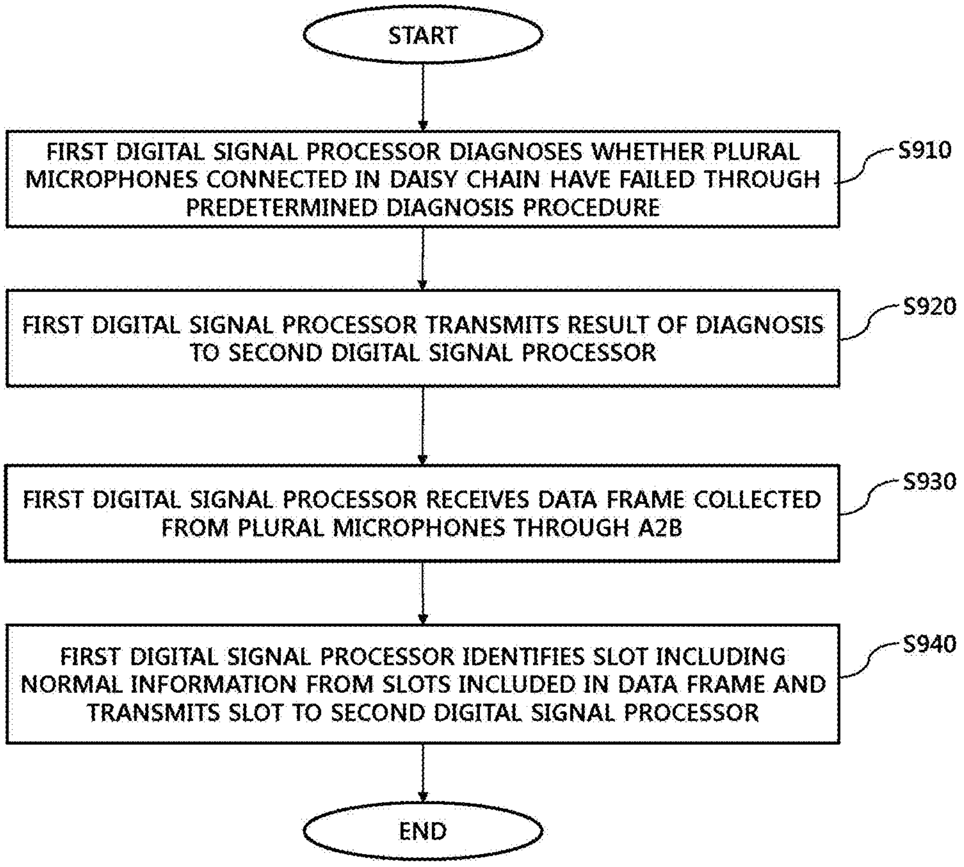
FIG. 9 is a flowchart illustrating an active road noise control method in an active road noise controller according to an exemplary embodiment of the present invention.

FIG. 9 is a flowchart illustrating an active road noise control method in an active road noise controller according to an exemplary embodiment of the present invention.

FIG. 9 is a flowchart illustrating a data processing method for active road noise control in a DSP (hereinafter, for convenience of description, referred to as a first digital signal processor) for performing A2B communication with microphones and acceleration sensors connected in a daisy chain between two DSPs provided in an active road noise controller.

Referring to FIG. 9, when an active road noise controller is driven, a first digital signal processor may diagnose whether a plurality of microphones connected in the daisy chain has failed through a predetermined diagnosis procedure (S910).

The first digital signal processor may transmit a result of diagnosing the plurality of microphones to a second digital signal processor (S920).

The first digital signal processor may receive a data frame collected from the plurality of microphones through an A2B (S930).

The first digital signal processor may identify a slot including normal information among the slots included in the data frame and transmit the slot to the second digital signal processor (S940).

Figure 10:
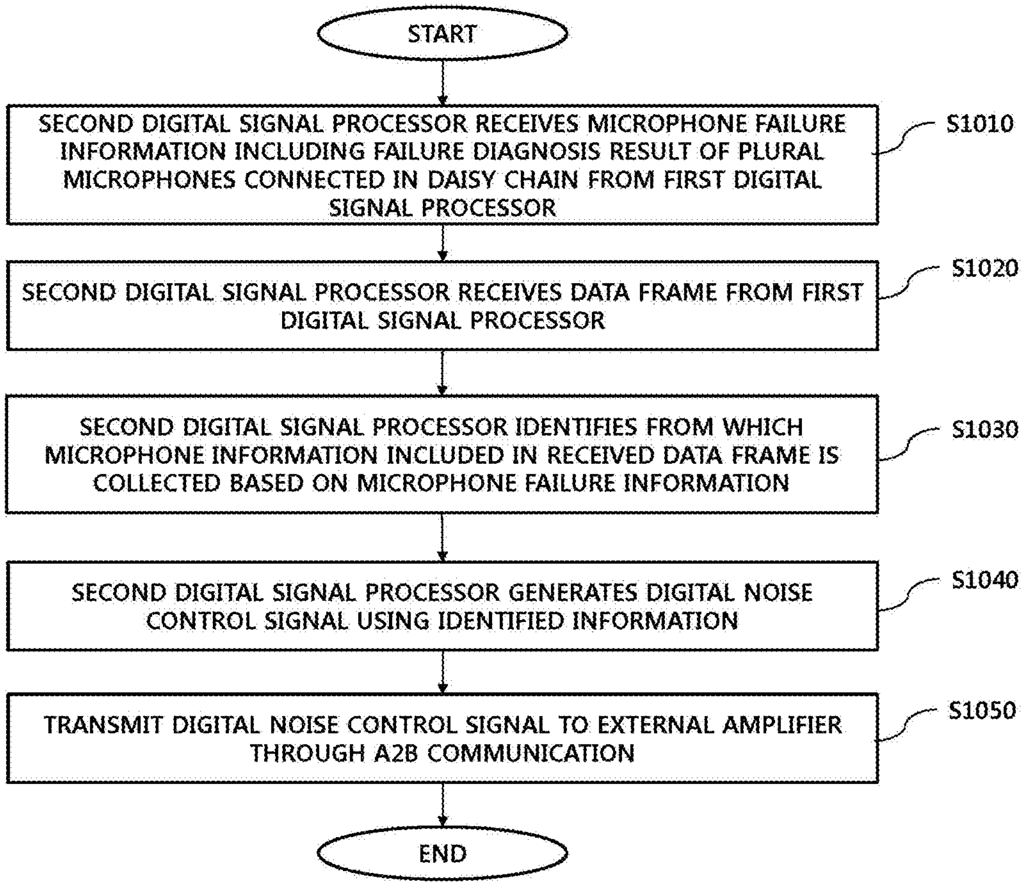
FIG. 10 is a flowchart illustrating an active road noise control method in an active road noise controller according to various exemplary embodiments of the present invention.

FIG. 10 is a flowchart illustrating an active road noise control method in an active road noise controller according to various exemplary embodiments of the present invention.

FIG. 10 is a flowchart illustrating a data processing method for active road noise control in a second digital signal processor connected to a DSP (hereinafter, for convenience of description, referred to as a first digital signal processor) for performing A2B communication with microphones and acceleration sensors connected in a daisy chain between two DSPs provided in an active road noise controller.

The second digital signal processor may receive microphone failure information including a failure diagnosis result of a plurality of microphones connected in a daisy chain from the first digital signal processor (S1010).

The second digital signal processor may receive the data frame from the first digital signal processor (S1020). Here, the data frame may include only information collected from a normal microphone.

The second digital signal processor may identify from which microphone the information included in the received data frame is collected, based on pre-received microphone failure information (S1030).

The second digital signal processor may generate a digital noise control signal using the identified information, that is, information collected through a normal microphone (S1040). The second digital signal processor according to an exemplary embodiment of the present invention may generate a digital noise control signal by further using reference signals collected from the acceleration sensors connected in the daisy chain.

The second digital signal processor may transmit the generated digital noise control signal to the external amplifier through A2B communication (S1050). At the instant time, the external amplifier may mix the digital sound source signal received from the sound source DSP with the digital noise control signal to generate digital active noise control sound, amplify the digital active noise control sound through the digital power amplifier and output the amplified digital active noise control sound through an external speaker.

Those skilled in the art will appreciate that the present invention may be conducted in other specific ways than those set forth herein without departing from the spirit and essential characteristics of the present invention.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An active road noise control method in an active road noise controller disposed in a vehicle, the active road noise control method comprising:

diagnosing, by the active road noise controller, when a plurality of microphones connected in a daisy chain has failed;

receiving, by the active road noise controller, a data frame from the plurality of microphones;

identifying, by the active road noise controller, normal information related to information included in the data frame based on a result of diagnosis;

generating, by the active road noise controller, a digital noise control signal using the identified normal information; and transmitting, by the active road noise controller, the generated digital noise control signal to an external amplifier connected to the active road noise controller, wherein the data frame includes a plurality of slots recording information of the corresponding microphones, wherein numbers of the slots and microphones are the same, wherein the active road noise controller diagnoses when the corresponding microphones have failed based on information recorded in the slots, and wherein the external amplifier includes a mixing digital signal processor, and the mixing digital signal processor mixes a digital sound source signal received from a sound source digital signal processor with the digital noise control signal and transmits the mixed signal to a digital power amplifier.

2. The active road noise control method according to claim 1, further including receiving a reference signal from a plurality of acceleration sensors connected in a daisy chain therebetween, wherein the active road noise controller is configured to generate the digital noise control signal by further using the reference signal.

3. The active road noise control method according to claim 2, wherein the data frame and the reference signal are received through communication of at least one automotive audio bus.

4. The active road noise control method according to claim 1, wherein the active road noise controller includes:

a first digital signal processor communicating with the plurality of microphones; and a second digital signal processor communicating with the first digital signal processor.

5. The active road noise control method according to claim 1, wherein, when power is applied to the active road noise controller, the first digital signal processor diagnoses when failure has occurred and transmits the result of diagnosis to the second digital signal processor.

6. The active road noise control method according to claim 5, wherein the first digital signal processor extracts and transmits a slot including the normal information from among the slots included in the data frame to the second digital signal processor based on the result of the diagnosis.

7. The active road noise control method according to claim 1, wherein the active road noise controller transmits the digital noise control signal to the external amplifier through communication of at least one automotive audio bus.

8. An active road noise controller connected to an external amplifier for a vehicle to control active road noise, the active road noise controller including:

a first digital signal processor for diagnosing when a plurality of microphones connected in a daisy chain therebetween has failed and identifying normal information related to information included in a data frame based on a result of diagnosis upon receiving the data frame from the plurality of microphones; and a second digital signal processor for generating a digital noise control signal using the identified normal information and transmitting the generated digital noise control signal to the external amplifier connected to the active road noise controller, wherein the data frame includes a plurality of slots recording information of the corresponding microphones, wherein numbers of the slots and microphones are the same, wherein the first digital signal processor diagnoses when the corresponding microphones have failed based on information recorded in the slots, and wherein the external amplifier includes a mixing digital signal processor, the mixing digital signal processor mixes a digital sound source signal received from a sound source digital signal processor with the digital noise control signal to generate digital active road noise control sound, and the digital active road noise control sound is output as an analog signal through a digital power amplifier and a speaker provided in the external amplifier.

9. The active road noise controller according to claim 8, wherein the first digital signal processor further receives and provides a reference signal from a plurality of acceleration sensors connected in a daisy chain to the second digital signal processor, and the second digital signal processor generates the digital noise control signal by further using the reference signal.

10. The active road noise controller according to claim 9, wherein the data frame and the reference signal are received through communication of at least one automotive audio bus.

11. The active road noise controller according to claim 8, wherein, when power is applied to the active road noise controller, the first digital signal processor diagnoses when failure has occurred and transmits the result of the diagnosis to the second digital signal processor.

12. The active road noise controller according to claim 8, wherein the first digital signal processor extracts and transmits a slot including the normal information among the slots included in the data frame to the second digital signal processor based on the result of the diagnosis.

13. The active road noise controller according to claim 8, wherein the second digital signal processor transmits the digital noise control signal to the external amplifier through communication of at least one automotive audio bus.

14. The active road noise controller according to claim 8, wherein the output analog signal is fed back and input to the plurality of microphones.

15. An active road noise control system disposed in a vehicle to control road noise generated upon driving the vehicle, the active road noise control system including:

an active road noise controller including a first digital signal processor for diagnosing when a plurality of microphones connected in a daisy chain therebetween has failed and identifying normal information related to information included in a data frame based on a result of diagnosis upon receiving the data frame from the plurality of microphones, and a second digital signal processor for generating a digital noise control signal using the identified normal information; and an external amplifier for mixing the digital noise control signal with a digital sound source signal received from a sound source digital signal processor and generating and outputting digital active road noise control sound, wherein the data frame includes a plurality of slots recording information of the corresponding microphones, wherein numbers of the slots and microphones are the same, and wherein the first digital signal processor diagnoses when the corresponding microphones have failed based on information recorded in the slots.

16. The active road noise control system according to claim 15, wherein the first digital signal processor further receives a reference signal from a plurality of acceleration sensors connected in a daisy chain, and the second digital signal processor generates the digital noise control signal by further using the reference signal.

17. The active road noise control system according to claim 16, wherein the data frame and the reference signal are received through communication of at least one automotive audio bus.

18. The active road noise control system according to claim 17, wherein the first digital signal processor extracts and transmits a slot including the normal information from among the slots included in the data frame to the second digital signal processor based on the result of the diagnosis.

* * * * *